Oct. 24, 1950 — L. B. EDELMAN — 2,526,645
INTERMITTENT-FIRING THERMAL AIR JET MOTOR
WITH OSCILLATING FLAPPER VALVE CONTROL
Filed Oct. 12, 1945 — 2 Sheets-Sheet 2

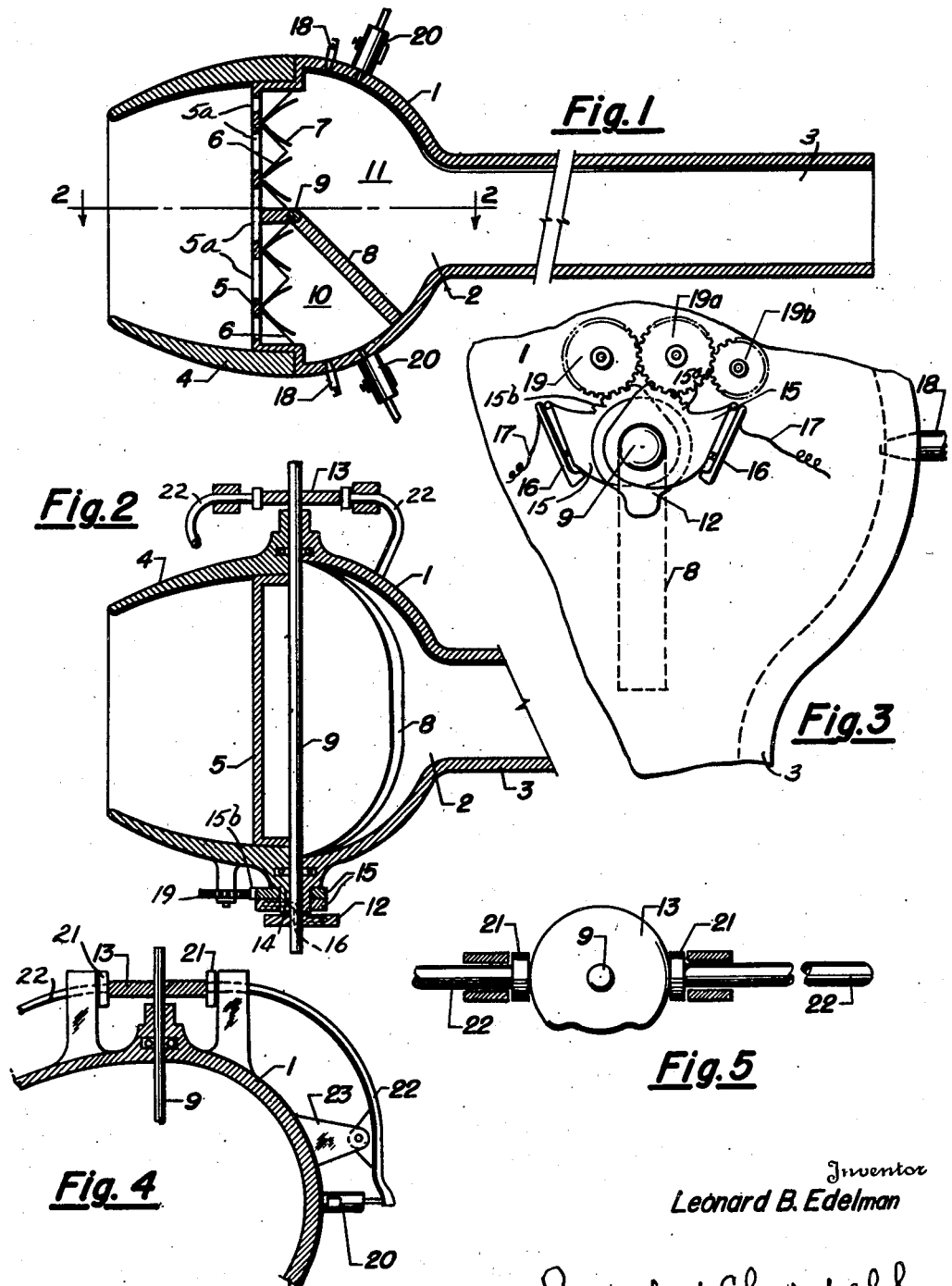

Inventor
Leonard B. Edelman
By Ralph L. Chappell
Attorney

Patented Oct. 24, 1950

2,526,645

UNITED STATES PATENT OFFICE 2,526,645

INTERMITTENT-FIRING THERMAL AIR JET MOTOR WITH OSCILLATING FLAPPER VALVE CONTROL

Leonard B. Edelman, United States Navy

Application October 12, 1945, Serial No. 622,111

9 Claims. (Cl. 60—35.6)

(Granted under the act of March 3, 1883, as amended April 30, 1928; 370 O. G. 757)

This invention relates to improvements in jet motors and is particularly directed to the intermittent resonating or pulsating jet motor type.

A principal object of the present invention is to provide a simple, efficient and expendable power plant for use on target drones in controlling missiles or on any type of aircraft operating at extreme speeds and altitudes.

Further objects of the invention are to provide a jet motor characterized by the following:

1. Precompression of the fuel air mixture to variable pressures above atmospheric pressure with the energy for this pre-compression being extracted from the previous explosion or burning of the mixture and delivered by a unique oscillation plate or flapper piston valve.

2. Practically constant volume combustion made possible by the inertia of the piston valve.

3. Arbitrarily timed ignition or compression ignition, and arbitrarily timed fuel injection mechanism actuated by energy driven from the preceding cycle and delivered via the inertia of the piston valve.

4. Adjustment, during operation, of the compression ratio, peak chamber pressure, and expansion ratio and fuel mixture; this adjustment being accomplished by regulation of the timing and of the quantity of fuel injected per stroke.

5. Possibility of extracting energy from the intermittent resonant or pulsating cycle to drive any type of air compressor to aid in pre-compressing and/or scavenging and refilling with cold air.

6. A simpler construction than existing thermal-propulsive devices which utilize pre-compression and/or constant volume burning such as the gasoline engine-propeller combination, turbo-jet, gas turbine-propeller, etc. giving promise of high over-all efficiency with economy and expendability.

7. Possibility of extracting energy from the intermittent resonant or pulsating cycle to drive any type of high capacity air intake valves.

These and other objects and advantages of the invention will be apparent from the following specification and taken with the accompanying drawings wherein like numerals refer to like parts in which:

Fig. 1 is a sectional view of the invention taken along its longitudinal axis;

Fig. 2 is a sectional view taken on the line 2—2 of Fig. 1;

Fig. 3 is a partial plan view of the ignition timing mechanism;

Fig. 4 is a partial section of the device showing the fuel pump mechanism;

Fig. 5 is a partial view of the fuel injection mechanism;

Figure 6:
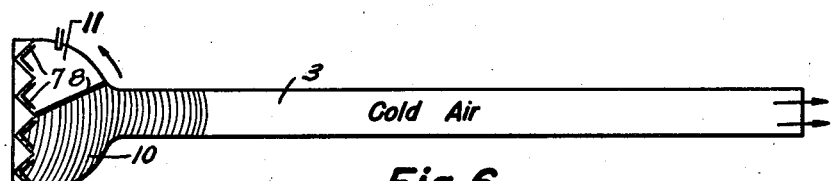
Figure 7:
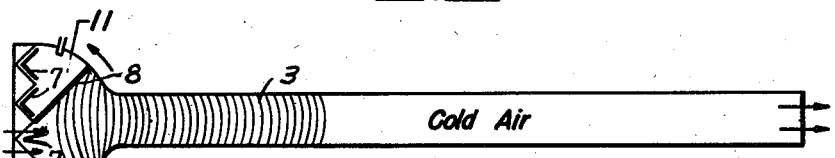
Figure 8:
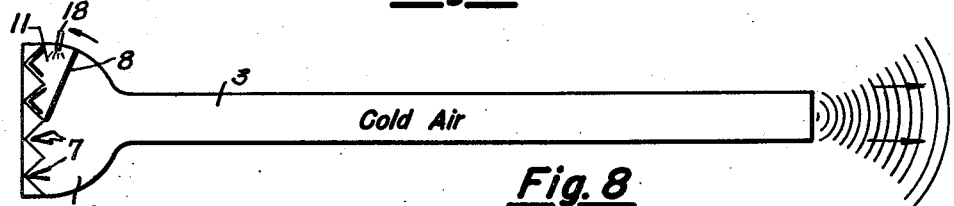
Figure 9:
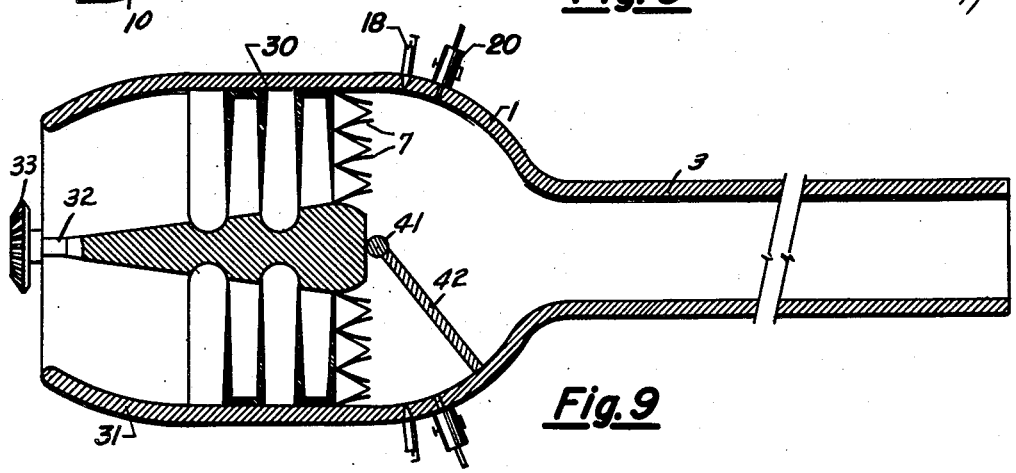
Figure 10:
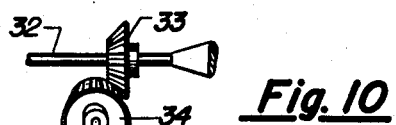

Figs. 6 to 8, inclusive, are diagrammatic views of the device with the flapper piston valve in different positions during a cycle of operation;

Fig. 9 is a cross-sectional view of a different embodiment of the invention; and Fig. 10 is a schematic diagram of the mechanism for actuating an air compressor.

As shown by Figs. 1 to 5, inclusive, numeral 1 refers to a hollow hemisphere forming a chamber therein and having an opening 2 to which a tail pipe 3 is connected. Secured to the forward or rim portion of the hemisphere 1 there is an annular air diffuser 4 of increasing diameter in the direction of air inflow, the united hemisphere 1 and air diffuser 4 composing a substantially globular hollow head which comprises the bulbous terminal of one end of the tail pipe. Two chambers, respectively denominated a firing chamber and an air induction chamber, are formed within the hemisphere 1 and the annular air diffuser 4 by a grill 5 which spans the interior of the hollow head, said grill having a plurality of valve supports 6 secured thereon and a plurality of openings 5a between said supports. A plurality of air intake valves 7 of the flexible reed or other suitable type are pivotally mounted on the supports 6. A flapper piston or plate valve 8 is pivotally mounted in the chamber formed by hemisphere 1, having a rocker shaft 9 journalled in bearings in opposite walls of the hemisphere and adjacent to the grill 5. The flapper piston valve 8 is shaped to conform with the inner wall of the hemisphere 1 forming a tight sliding fit and dividing the firing chamber alternately into separate and distinct combustion chambers 10 and 11 at diametric sides of the tail pipe gas inlet as the valve 8 vibrates past said inlet. Symmetrically arranged on each side of the hemisphere forming the combustion chambers 10 and 11 are spark plugs 18 and fuel injectors 20.

On each end of the shaft 9, which extends beyond hemisphere 1, there are cam actuated mechanisms respectively for operating the fuel injection and ignition systems. Referring now particularly to Figs. 2 and 3, a cam 12 is mounted on one end of the shaft 9 and turns with it. Oscillatably mounted on shaft 9 and on a sleeve 14 formed on the hemisphere 1 and adjacent to the cam 12 there are breaker point mounts 15 on which are pivotally secured a pair of breaker points 16 whose offset free ends are actuated by the cam surface on the cam 12. Electric conduits 17 are connected at one of each of their ends to the breaker points 16 and to the primary winding of a spark coil (not shown) at their other ends while the secondary winding of the spark coil is connected to the spark plugs 18. A setting gear train consisting of two engaging gears 19 and 19a which are turnably mounted on the hemisphere 1, and respectively engage gear segments 15a, 15b of the mounts 15 to set the breaker points 16 either closer together or farther apart than shown. To make such adjustments of the spark in the ignition system for different positions of the piston flapper valve 8 a gear 19b is adapted to be operated to turn gears 19 and 19a in one or the other direction thereby either to advance or retard the spark. The current in the ignition system is normally grounded, thus preventing flow of the current to the spark plug. When the breaker point contact is in an open position the grounded circuit is open and current flows to the spark plug wherein a hot spark is created in one or the other of the plugs 18.

Now referring to Figs. 4 and 5 a second cam 13 fixed on the other end of the shaft 9, so as to oscillate with same is operatively engaged with a pair of cam followers 21, which are each fixed to the end of levers 22. The levers 22, which are pivoted on fulcrums 23 secured to the hemisphere 1 are connected at their free end to conventional fuel injectors 20 whose operation is well known in the art. At a predetermined position of the flapper piston valve 8, the cam 13 actuates a fuel injector, forcing fuel under pressure to flow into the combustion chamber.

Now referring particularly to Figs. 6 to 8, inclusive, in the normal operation of the device the flapper piston valve 8 is caused to oscillate by the energy created by a previous explosion or burning. As the piston valve 8 oscillates in the direction shown by the arrow in Fig. 6, the air in the chamber 11 is being compressed since the reed valves 7 in their chambers are closed by the higher pressure in the chamber. At the same time the explosion or burning having previously taken place in the chamber 12, is now being discharged through the tail pipe 3 bringing about a drop in pressure in chamber 12 and causing the reed valves 7 in the chamber 12 to open. As shown by Fig. 7, the flapper piston valve 8 continues to move in a direction to compress the air in the chamber 11 until the cam 13 actuates the injector 20 to permit fuel to enter the chamber 11. At a predetermined position of the flapper valve 8 as shown by Fig. 8 the cam 12 actuates the respective breaker point 16 to its open position causing a spark at the spark plug 18 of chamber 11 to ignite the explosive mixture in the chamber 11. The explosion then causes the flapper valve 8 to move in the opposite direction and commence a pre-compression cycle in the chamber 12 identical to that which occurred previously in chamber 11. After each explosion and before the succeeding explosion, a blast of cold air enters the combustion chamber and discharges through the tail pipe, thus enhancing the reactive forces generated by the rapidly expanding gases, thus giving the device a greater forward motion. The volume of the fuel air mixture and, in most cases, the pressure of this mixture will be practically constant for each burning. As a result the reactive thrust created by each explosion or burning will be nearly constant giving the device a constant velocity rather than a series of jerking or uneven thrusts which would tend to change the direction of travel of the device.

Referring now to Figs. 9 and 10 wherein a modification of the device is shown, an axial flow compressor 30 is positioned within an air duct or diffuser 31. Rotatably mounted on the compressor shaft 32 is a gear 33. A second gear 34 which meshes with the gear 33 is mounted on a crank shaft 35 to which a rod 36 is connected. The free end of the rod 36 is fixed to a guide block 37 which reciprocates within a guide 38 and connected to a plurality of levers 39 and 40, the latter lever being connected to a rotatable shaft 41 of a flapper piston valve 42. In this embodiment, the oscillating movement of the flapper piston valve 42 is converted to a rotational movement by means of the aforementioned mechanism thus causing the compressor 30 to rotate at a fairly constant velocity. The air entering the combustion chambers within the hemisphere 1 of this device will be under pressure and will be further compressed by the movement of the flapper piston valve 42 so that a larger amount of air is available for burning and a greater reactive force obtained thereby increasing the velocity of the jet device. It is to be noted that the internal shape of the combustion chambers formed by the housing does not of necessity have to be hemispherical but can be of any shape divisible into two or more chambers capable of being swept by a valve. An important factor in the combination is that the clearance between the flapper valve and the side walls of the combustion chamber be at a minimum.

While the forms of mechanism herein shown and described constitute the preferred forms of embodiment of the present invention, it is understood that other forms might be adapted or coming within the scope of the claims which follow.

The invention described herein may be manufactured and used by or for the Government of the United States of America for governmental purposes without the payment of any royalties thereon or therefor.

What I claim is:

1. An intermittent firing thermal air jet motor comprising a housing having an inlet and an outlet, a tail pipe connected to said outlet, pressure responsive valve means mounted directly across said inlet adapted to control the flow of air therethrough, a piston flapper valve mounted in said housing forming with portions of said housing and of said valve means two combustion chambers, means pivoting the valve in said housing, fuel inlet means and ignition means on said housing adjacent each of said combustion chambers, and means operably connected between said valve pivot means, said fuel inlet means and said ignition means for actuating the fuel inlet and ignition means at predetermined positions of said flapper valve.

2. A jet motor comprising a hemispherical housing having an outlet and an inlet, a tail pipe joining said housing at said outlet, a plurality of reed valves mounted adjacent said inlet for controlling the inflow of air therethrough, a plate valve movably fitting in said housing and forming adjoining combustion chambers, means pivoting said plate valve adjacent said reed valves, fuel inlet means and ignition means mounted on said housing adjacent each of said combustion chambers, and means operatively extending from said valve pivot means to said fuel inlet means and said ignition means for actuating said fuel inlet and ignition means at predetermined positions of said plate valve.

3. A jet motor comprising a housing having inlet means and an outlet at opposite ends along its longitudinal axis, a coaxial tail pipe connected to said housing over its outlet, automatically operative valves mounted on said inlet means for controlling the flow of air therethrough, fuel inlet means and ignition means mounted on said housing, a flapper piston valve means centrally positioned within said housing having a flap portion which operates the valves on said inlet means, means pivotally mounting said piston valve adjacent said inlet means, and means operatively extending from said valve pivot means to said fuel inlet means and said ignition means for actuating said fuel inlet and ignition means at predetermined positions of said flapper valve.

4. A jet motor comprising a hemispherical housing having an outlet, an air diffuser mounted on said housing and constituting an air inlet, a tail pipe secured to said outlet, a plurality of reed valves mounted on the housing adjacent said diffuser for controlling the flow of air through the diffuser, a flapper plate valve positioned in said housing and dividing the housing into two combustion chambers, a support mounted adjacent said reed valves, a rotatable shaft mounted on said support and carrying said plate valve, pairs of fluid inlet and ignition means for each combustion chamber, and cam means mounted on said shaft adapted to actuate said fuel inlet means and said ignition means at predetermined positions of said flapper valve.

5. A jet motor comprising a tail pipe, a substantially globular hollow head having inlet and outlet openings, said head being attached at its outlet opening to the tail pipe, a grill spanning the interior of the head and forming air induction and firing chambers adjacent to the respective inlet and outlet openings, valve means on the grill controlling the passage of air from the induction chamber through the grill openings to the firing chamber, a rocker shaft journalled in the head adjacent to the grill, having a plate valve oscillatably fitting the firing chamber and dividing it to define combustion chambers on alternate sides of said valve and on compressing movements thereof, pairs of fuel injection and ignition means exposed to each of the combustion chambers, and separate means interconnecting the shaft and the respective injection and ignition means for charging the combustion chambers and igniting the fuel in time with the compressing movements of the plate valve.

6. A jet motor comprising a tail pipe having an end open to atmosphere, a substantially globular hollow head integral with the other end of the pipe and constituting the terminal thereof, said head having an air inlet opening and having an outlet opening at its point of union with the pipe, and means embodied in said terminal head for producing a succession of pressure pulses dischargeable at the open end of the pipe, said means consisting of a plate valve periodically sweeping across said outlet opening, a valved grill disposed transversely of said head and respecting which said valve is oscillatable to define a pair of closed explosion chambers at alternately opposite sides of the valve after it passes said outlet opening, and pairs of fuel injection and ignition means projecting into the potential explosion chambers, sequentially introducing and igniting a charge of fuel on each approach of the plate valve.

7. A jet motor comprising a tail pipe open at each end, a hollow head constituting an enlarged terminal beyond the opening at one end of the pipe, a valve in the head for passing the respective tail pipe opening in alternately opposite directions, a valved grill adjacent to which the valve is swingably mounted and respecting which and adjoining wall portions of the head said valve forms a combustion chamber during each of its alternate swingings, said valved grill including valves which are responsive to the pressures created by the said swinging valve to control the air flow and fuel injection and ignition means for each combustion chamber operating in timed relationship to the swingings of the valve to produce pulses of expansive gas for projection into the tail pipe and out at its other end.

8. An intermittent firing thermal air jet motor of the expendable type comprising a substantially straight tail pipe having a gas inlet and a gas outlet, and means for projecting pressure pulses of gas into the inlet for expulsion at the outlet, said means consisting of a bulbous forward enlargement of the pipe at its inlet, said enlargement having an atmospheric air intake, means situated in the enlargement alternately delineating explosion chambers at diametric sides of the pipe gas inlet, said means including a vibratory member sweeping across said inlet as impelled by alternate gas expansions in the explosion chambers, said vibrating member having a thickness which is less than the width of the outlet so that at least one combustion chamber forming portion is in communication with the outlet and tail pipe at all times, and fuel injection and ignition means for each of the chambers.

9. An intermittent firing thermal air jet motor comprising a housing having an inlet and an outlet, a tail pipe connected to the outlet, valve means at said inlet for intermittently introducing a flow of air into the motor, a piston flapper valve mounted directly across said inlet and alternately forming with portions of said housing and the valve means two combustion chambers, means for pivotally mounting said flapper valve in said housing, said flapper valve being moveable by explosions in said combustion chambers and having a thickness which is less than the width of the outlet and tail pipe so that at least one of the combustion chamber forming portions of the housing are in communication with the outlet and tail pipe at all times, and fuel injection and ignition means for each of the combustion chambers.

LEONARD B. EDELMAN.

REFERENCES CITED

The following references are of record in the file of this patent:

UNITED STATES PATENTS

| Number | Name | Date |
|---|---|---|
| 1,080,272 | Fletcher | Dec. 2, 1913 |
| 1,109,341 | Kress | Sept. 1, 1914 |
| 2,201,785 | Ney | May 21, 1940 |
| 2,397,654 | Forsyth | Apr. 2, 1946 |

FOREIGN PATENTS

| Number | Country | Date |
|---|---|---|
| 27,724 | Great Britain | Dec. 16, 1907 |